United States Patent
Marks et al.

(10) Patent No.: US 7,299,125 B2
(45) Date of Patent: Nov. 20, 2007

(54) IN-TRANSIT PACKAGE LOCATION TRACKING AND REPORTING

(75) Inventors: Laurence V. Marks, Raleigh, NC (US); Daniel A. Marks, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 10/824,669

(22) Filed: Apr. 14, 2004

(65) Prior Publication Data
US 2005/0234641 A1    Oct. 20, 2005

(51) Int. Cl.
*G01C 21/36* (2006.01)
*G08G 1/123* (2006.01)

(52) U.S. Cl. .............. 701/201; 701/200; 701/213; 342/357.07; 342/357.08; 342/357.01; 340/988

(58) Field of Classification Search ........ 701/200–202, 701/207–208, 209, 213–215; 235/375, 383; 700/213, 225; 342/357.06, 357.12, 357.01, 342/357.08, 357.07; 340/988
See application file for complete search history.

(56) References Cited

U.S. PATENT DOCUMENTS

| | | | |
|---|---|---|---|
| 4,588,881 A | | 5/1986 | Pejas et al. |
| 4,688,244 A | * | 8/1987 | Hannon et al. ............... 377/58 |
| 5,758,313 A | | 5/1998 | Shah et al. |
| 6,070,793 A | | 6/2000 | Reichl et al. |
| 6,220,509 B1 | | 4/2001 | Byford |
| 6,240,365 B1 | * | 5/2001 | Bunn .......................... 701/213 |
| 6,298,306 B1 | | 10/2001 | Suarez et al. |
| 6,394,354 B1 | | 5/2002 | Wilz, Sr. et al. |
| 6,463,420 B1 | | 10/2002 | Guidice et al. |
| 6,496,775 B2 | | 12/2002 | McDonald, Jr. et al. |
| 6,584,403 B2 | * | 6/2003 | Bunn .......................... 701/213 |
| 7,118,034 B2 | * | 10/2006 | Baldassari et al. .......... 235/383 |
| 2004/0148052 A1 | * | 7/2004 | Ferguson et al. ........... 700/213 |

* cited by examiner

*Primary Examiner*—Yonel Beaulieu
(74) *Attorney, Agent, or Firm*—Sawyer Law Group LLP

(57) ABSTRACT

Methods, program products, and apparatus for reporting the location of packages or parcels as they move from a reception location through various vehicles and distribution locations to a delivery location. The methods, products, and apparatus enable any interested user to access a consolidated display showing the detailed progress of a package toward delivery, including real-time location information of any delivery vehicle carrying the package.

18 Claims, 14 Drawing Sheets

Package Delivery Company: Tracking - e-Web Browser

Home Ship Track Transit Times Rates Pickups Locations Supplies

Package Delivery Company

Tracking Results

Tracking Number: 1Z 234 567 89 0123 456 7

Shipment Summary:
  Current Status: Delivered
  Delivered on: June 16, 2002 1:30 PM
  Delivered to:
  Signed for by: J. Marks

Shipment History:

| Date | Time | Activity | Location |
|---|---|---|---|
| June 11 2002 | 11:30 AM | Picked up | Shipper's door |
|  | 5:24 PM | On Eastbound truck | San Francisco, CA |
| June 16 2002 | 4:58 AM | On truck to Raleigh NC | Greensboro NC |
|  | 8:30 AM | On local Delivery tk | Raleigh NC |
|  | 1:30 PM | Delivered | Raleigh NC |

Shipper: Rocket Merchandise    Receiver: Laurence and Jan Marks
Palo Alto, CA 94301                                Raleigh, NC 27612

Shipment Detail:
Service: Ground                            Parcel Type: Package
Weight: 10 lbs                              Description: Speaker
Pieces: 1                                    Shipper's Reference: 02468

Fig. 1
(Prior Art)

| Package Delivery Company: Tracking - e-Web Browser |
|---|

Home Ship Track Transit Times Rates Pickups Locations Supplies

Package Delivery Company

Tracking Results

Tracking Number: 1Z 234 567 89 0123 456 7

Shipment Summary:
  Current Status: Enroute
  Delivered on:
  Delivered to:
  Signed for by:

Shipment History:

| Date | Time | Activity | Location |
|---|---|---|---|
| June 11 2002 | 11:30 AM | Picked up | Shipper's door San Francisco, CA |
| | 5:24 PM | On Eastbound truck | |
| | | Receiver: | Laurence and Jan Marks Raleigh, NC 27612 |

Shipper: Rocket Merchandise
  Palo Alto, CA 94301

Shipment Detail:
Service: Ground
Weight: 10 lbs
Pieces: 1

Parcel Type: Package
Description: Speaker
Shipper's Reference: 02468

Fig. 2
(Prior Art)

| Tracking No. | Time | Date | Activity | Vehicle ID |
|---|---|---|---|---|
| 1Z 234 567 89 0123 456 7 | 5:24 PM | June 11 | On truck | 127816 |

310 → Vehicle ID
330 → Activity
325 → Date
320 → Time
315 → Tracking No.

Fig. 3

Package Delivery Company: Tracking - e-Web Browser

Home Ship Track Transit Times Rates Pickups Locations Supplies

Package Delivery Company

Tracking Results

Tracking Number: 1Z 234 567 89 0123 456 7

Shipment Summary:
Current Status: Enroute
Delivered on
Delivered to:
Signed for by:

Shipment History:

| Date | Time | Activity | Location |
|---|---|---|---|
| June 11 2002 | 11:30 AM | Picked up | Shipper's door |
| | 5:24 PM | On truck | San Francisco, CA |
| June 12 2002 | 4:30 PM | Enroute | Los Angeles CA |

Shipper: Rocket Merchandise  Receiver: Laurence and Jan Marks
Palo Alto, CA 94301               Raleigh, NC 27612

Shipment Detail:
Service: Ground          Parcel Type: Package
Weight: 10 lbs           Description: Speaker
Pieces: 1                Shipper's Reference: 02468

602 — (Tracking Number callout)
604 — (Location entries callout)

Fig. 6

Package Delivery Company: Tracking - e-Web Browser

Package Delivery Company

Home  Ship  Track  Transit Times  Rates  Pickups  Locations  Supplies

Tracking Results

Tracking Number: 1Z 234 567 89 0123 456 7 — 602

Shipment Summary:
Current Status: Enroute
Delivered on:
Delivered to:
Signed for by:

Shipment History:

| Date | Time | Activity | Location |
|---|---|---|---|
| June 11 2002 | 11:30 AM | Picked up | Shipper's door |
| | 5:24 PM | On truck | San Francisco, CA |
| June 12 2002 | 4:30 PM | Enroute | Los Angeles CA |
| June 13 2002 | 11:38 AM | Enroute | Phoenix AZ |

(Location column braced as 604)

Shipper: Rocket Merchandise  Receiver: Laurence and Jan Marks
Palo Alto, CA 94301                       Raleigh, NC 27612

Shipment Detail:
Service: Ground                    Parcel Type: Package
Weight: 10 lbs                     Description: Speaker
Pieces: 1                          Shipper's Reference: 02468

Fig. 7

Package Delivery Company: Tracking - e-Web Browser

| Package Delivery Company | Home Ship Track <u>Transit Times Rates Pickups Locations Supplies</u> |
|---|---|

Tracking Results

Tracking Number: 1Z 234 567 89 0123 456 7 — 602

Shipment Summary:
   Current Status: Enroute
   Delivered on:
   Delivered to:
   Signed for by:

Shipment History:

| Date | Time | Activity | Location |
|---|---|---|---|
| June 11 2002 | 11:30 AM | Picked up | Shipper's door |
|  | 5:24 PM | On truck | San Francisco, CA |
| June 12 2002 | 4:30 PM | Enroute | Los Angeles CA |
| June 13 2002 | 11:38 AM | Enroute | Phoenix AZ |
|  | 7:30 PM | Enroute | Santa Fe NM |
| June 14 2002 | 12:25 PM | Enroute | Okla. City OK |

604 (brace on Location column)

Shipper: Rocket Merchandise
   Palo Alto, CA 94301

Receiver: Laurence and Jan Marks
   Raleigh, NC 27612

Shipment Detail:
Service: Ground
Weight: 10 lbs
Pieces: 1

Parcel Type: Package
Description: Speaker
Shipper's Reference: 02468

Fig. 8

Package Delivery Company: Tracking - e-Web Browser

| Package Delivery Company | Home Ship Track Transit Times Rates Pickups Locations Supplies |
|---|---|

Tracking Results

Tracking Number: 1Z 234 567 89 0123 456 7 — 602

Shipment Summary:
   Current Status: Enroute
   Delivered on:
   Delivered to:
   Signed for by:

Shipment History:

| Date | Time | Activity | Location |
|---|---|---|---|
| June 11 2002 | 11:30 AM | Picked up | Shipper's door |
|  | 5:24 PM | On truck | San Francisco, CA |
| June 12 2002 | 4:30 PM | Enroute | Los Angeles CA |
| June 13 2002 | 11:38 AM | Enroute | Phoenix AZ |
|  | 7:30 PM | Enroute | Santa Fe NM |
| June 14 2002 | 12:25 PM | Enroute | Okla. City OK |
| June 15 2002 | 10:41 AM | Enroute | Little Rock AR |

} 604

Shipper: Rocket Merchandise    Receiver: Laurence and Jan Marks
    Palo Alto, CA 94301                    Raleigh, NC 27612

Shipment Detail:
Service: Ground                  Parcel Type: Package
Weight: 10 lbs                    Description: Speaker
Pieces: 1                          Shipper's Reference: 02468

Fig. 9

Package Delivery Company: Tracking - e-Web Browser

Package Delivery Company

Home Ship Track Transit Times Rates Pickups Locations Supplies

Tracking Results

Tracking Number: 1Z 234 567 89 0123 456 7

Shipment Summary:
Current Status: Enroute
Delivered on:
Delivered to:
Signed for by:

Shipment History:

| Date | Time | Activity | Location |
|---|---|---|---|
| June 11 2002 | 11:30 AM | Picked up | Shipper's door |
|  | 5:24 PM | On truck | San Francisco, CA |
| June 12 2002 | 4:30 PM | Enroute | Los Angeles CA |
| June 13 2002 | 11:38 AM | Enroute | Phoenix AZ |
|  | 7:30 PM | Enroute | Santa Fe NM |
| June 14 2002 | 12:25 PM | Enroute | Okla. City OK |
| June 15 2002 | 10:41 AM | Enroute | Little Rock AR |
|  | 7:25 PM | Enroute | Nashville TN |

Shipper: Rocket Merchandise
Palo Alto, CA 94301

Receiver: Laurence and Jan Marks
Raleigh, NC 27612

Shipment Detail:
Service: Ground
Weight: 10 lbs
Pieces: 1

Parcel Type: Package
Description: Speaker
Shipper's Reference: 02468

602 (Tracking Number callout)
604 (Location list brace)

Fig. 10

Package Delivery Company: Tracking - e-Web Browser

Home Ship Track Transit Times Rates Pickups Locations Supplies

Package Delivery Company

Tracking Results

Tracking Number: 1Z 234 567 89 0123 456 7

Shipment Summary: — 602

Current Status: Enroute
Delivered on:
Delivered to:
Signed for by:

Shipment History:

| Date | Time | Activity | Location |
|---|---|---|---|
| June 11 2002 | 11:30 AM | Picked up | Shipper's door |
|  | 5:24 PM | On truck | San Francisco, CA |
| June 12 2002 | 4:30 PM | Enroute | Los Angeles CA |
| June 13 2002 | 11:38 AM | Enroute | Phoenix AZ |
|  | 7:30 PM | Enroute | Santa Fe NM |
| June 14 2002 | 12:25 PM | Enroute | Okla. City OK |
| June 15 2002 | 10:41 AM | Enroute | Little Rock AR |
|  | 7:25 PM | Enroute | Nashville TN |
| June 16 2002 | 4:58 AM | On truck to Raleigh NC | Greensboro NC |

(604 brace encompasses Location column)

Shipper: Rocket Merchandise
Palo Alto, CA 94301

Receiver: Laurence and Jan Marks
Raleigh, NC 27612

Shipment Detail:
Service: Ground
Weight: 10 lbs
Pieces: 1

Parcel Type: Package
Description: Speaker
Shipper's Reference: 02468

Fig. 11

Package Delivery Company: Tracking - e-Web Browser

Package Delivery Company

Home Ship Track Transit Times Rates Pickups Locations Supplies

Tracking Results

Tracking Number: 1Z 234 567 89 0123 456 7

Shipment Summary:
- Current Status: Delivered
- Delivered on: June 16, 2002 1:30 PM
- Delivered to:
- Signed for by: J. Marks

Shipment History:

| Date | Time | Activity | Location |
|---|---|---|---|
| June 11 2002 | 11:30 AM | Picked up | Shipper's door |
|  | 5:24 PM | On truck | San Francisco, CA |
| June 12 2002 | 4:30 PM | Enroute | Los Angeles CA |
| June 13 2002 | 11:38 AM | Enroute | Phoenix AZ |
|  | 7:30 PM | Enroute | Santa Fe NM |
| June 14 2002 | 12:25 PM | Enroute | Okla. City OK |
| June 15 2002 | 10:41 AM | Enroute | Little Rock AR |
|  | 7:25 PM | Enroute | Nashville TN |
| June 16 2002 | 4:58 AM | On truck to Raleigh NC | Greensboro NC |
|  | 8:30 AM | On local Delivery tk | Raleigh NC |
|  | 1:30 PM | Delivered | Raleigh NC |

Shipper: Rocket Merchandise
Palo Alto, CA 94301

Receiver: Laurence and Jan Marks
Raleigh, NC 27612

Shipment Detail:
- Service: Ground
- Weight: 10 lbs
- Pieces: 1

Parcel Type: Package
Description: Speaker
Shipper's Reference: 02468

Fig. 12

Package Delivery Company: Tracking - e-Web Browser

Home Ship Track Transit Times Rates Pickups Locations Supplies

Package Delivery Company / 602

Tracking Results

Tracking Number: 1Z 234 567 89 0123 456 7

Shipment Summary:
Current Status: Delivered
Delivered on:
Delivered to:
Signed for by:

Shipment History:

| Date | Time | Activity | Location |
|---|---|---|---|
| June 11 2002 | 11:30 AM | Picked up | Shipper's door |
|  | 5:24 PM | On truck | San Francisco, CA |
| June 12 2002 | 4:30 PM | Enroute* | Los Angeles CA |
| June 13 2002 | 11:38 AM | Enroute* | Phoenix AZ |
|  | 7:30 PM | Enroute* | Santa Fe NM |
| June 14 2002 | 12:25 PM | Enroute* | Okla. City OK |
| June 15 2002 | 10:41 AM | Enroute* | Little Rock AR |
|  | 7:25 PM | Enroute* | Nashville TN |
| June 16 2002 | 4:58 AM | On truck to Raleigh NC | Greensboro NC |
|  | 8:30 AM | On local Delivery tk | Raleigh NC |
|  | 1:30 PM | Delivered | Raleigh NC |

} 604

(* Package not scanned)

Shipper: Rocket Merchandise  Receiver: Laurence and Jan Marks
Palo Alto, CA 94301         Raleigh, NC 27612

Shipment Detail:
Service: Ground                     Parcel Type: Package
Weight: 10 lbs                      Description: Speaker
Pieces: 1                           Shipper's Reference: 02468

Fig. 13

IN-TRANSIT PACKAGE LOCATION TRACKING AND REPORTING

FIELD AND BACKGROUND OF THE INVENTION

Several trends in today's society have combined to produce a need for rapid and dependable delivery of parcels or packages (the terms being used interchangeably herein). These trends include the consolidation of parts warehouses for economic reasons, just-in-time manufacturing methods, consumer empowerment which includes internet shopping and the ever-growing need for rapid gratification. These trends have resulted in the establishment and growth of several business concerns whose service is parcel and package delivery by various means including air, rail, and ground, with promised transit times inversely related to fees.

Business and personal consumers have become dependent on these services, as exemplified by just-in-time manufacturing. Businesses can suffer serious disruption in the event of a lost or delayed shipment. Consumers become anxious or angry when shipments are lost or don't arrive when promised or expected. In order to resolve those concerns in an efficacious manner, shipping companies have come to provide tracking services. As practiced prior to this invention, each time a package is handled, a package tracking number or other identifying information (the "package identifier") and the location, time, and date are recorded in a database, often after capture by means of a bar code scanner or other automated method. The term package identifier as used herein includes instances where such an identifier may, in fact, refer to more than one package. Some shipping systems allow more than one package to be shipped under a single tracking number, or identifier. In such instances, the packages would be bound for the same destination and would, therefore, travel together from source location to destination location. In this way, the single package identifier could be used to track the location of the multiple packages shipped together.

The sender or recipient of a package can utilize the identifier assigned to the package to query the delivery company's database via e-mail inquiry, web browser or other method to find out its current status and whereabouts. FIG. 1 shows a sample tracking report form according to such prior art systems for a package which has been delivered. If a package is not delivered when expected, the shipping company can use the information in the database to begin looking for it at the point where it was last scanned. Where multiple packages were shipped under a single identifier, the group of packages could be tracked in the same way using the identifier.

This method of package tracking has served customers well, but it suffers from certain limitations which can become problematic. When a package in transit is not handled frequently, e.g., if it is on a cross-country aircraft, truck or rail car, new information is not made available to the database or to the requesting user. Considering the delivery example shown in FIG. 1, if a user were to make an inquiry about the package during any or all of the days between its departure from San Francisco on June 11 and its arrival in Greensboro on June 16, he would see no updates. Any inquiry made during this relatively long period of time would show only the information shown in FIG. 2. As a result, a user might be tempted to conclude that the package had been lost, misplaced or delayed. This might result in unnecessary inquiries to the delivery company, customer complaints and dissatisfaction, etc., all of which are undesirable and can potentially cost the delivery company time and money.

Additional information regarding the location of the transporting vehicle such as a truck or rail car is often available to the shipper, but is not made available to the package sender or recipient. There are a number of means by which trucks are regularly tracked; in addition to driver check-in, trucks may be tracked electronically, using the OmniTRACS® or TrailerTRACS® satellite systems from Qualcomm Incorporated, for example. Rail cars are also electronically tracked. In addition, evolving Global Positioning Satellite (GPS) technology increasingly allows exact vehicle location information to be available at all times. Vehicle location information may be tracked and stored in a database or can be delivered in real time by the tracking mechanism.

What is needed is an efficient and reliable way of linking package and vehicle information, including real-time vehicle location information, in a way that is accessible to interested users.

SUMMARY OF THE INVENTION

It has been discovered that the limitations of the prior art may be advantageously addressed by tracking delivery vehicle location in transit and linking the vehicle location information with the tracking information of packages carried therein. In this way, in response to an inquiry, an interested user may be provided with increased detail as to the location of an in-transit package.

In another aspect of the present invention, the method and apparatus utilized to gather information with respect to a package handling event when a package is being loaded onto a delivery vehicle is modified to include an identifier associated with the vehicle. In this way, the package identifiers may be associated with the identifier of the vehicle carrying the packages.

In a further aspect of the invention, vehicle position updates to the package tracking display are tagged in a unique manner to indicate that the information did not come from a physical package scan.

BRIEF DESCRIPTION OF DRAWINGS

Some of the purposes of the invention having been stated, others will appear as the description proceeds, when taken in connection with the accompanying drawings, in which:

FIG. 1 (prior art) shows the tracking display an interested user would see after a package has been delivered;

FIG. 2 (prior art) shows the tracking display an interested user would see for any of the several days the package of FIG. 1 is in transit;

FIG. 3 illustrates an exemplary record from the package tracking database in accordance with embodiments of the present invention;

FIG. 6-FIG. 11 each show an exemplary tracking display in accordance with an embodiment of the present invention at various points in the transit of a package traversing the country for delivery;

FIG. 12 shows the tracking display of the package of FIGS. 6-11 after it has been delivered;

FIG. 13 shows an exemplary tracking display in accordance with an alternative embodiment of the present invention which indicates which tracking points involved actual package scans;

DETAILED DESCRIPTION OF EMBODIMENTS OF THE INVENTION

Figure 4:
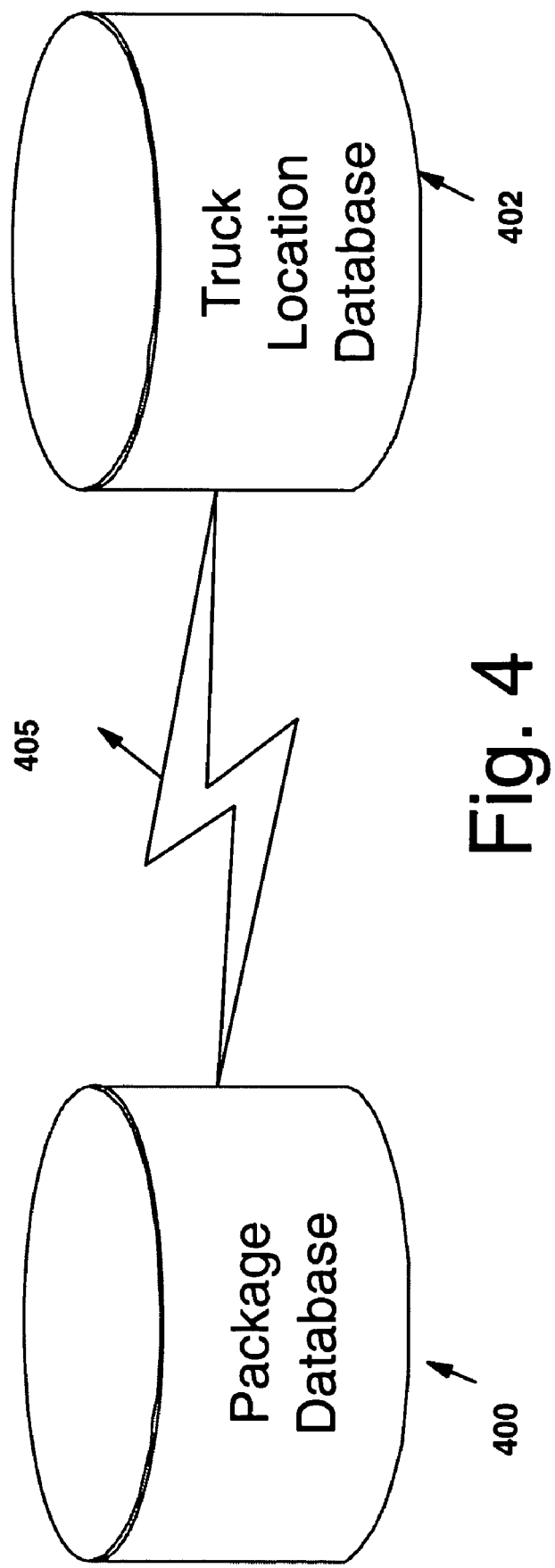
FIG. 4 shows the package tracking database and the vehicle location tracking database, along with the required link between the two.

While the present invention will be described more fully hereinafter with reference to the accompanying drawings, in which one or more preferred embodiments of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

In order to provide more detailed tracking information to an interested user, such as a package sender or recipient, when operating in accordance with an embodiment of the present invention, each time a package is placed on a delivery vehicle, whether it be a car, truck, airplane, railcar or otherwise, a vehicle identifier is recorded and associated with the package identity. The vehicle identification information may be recorded along with the other package information in a package tracking database, for example. The package and vehicle information may be entered into the database manually but is preferably captured into the database using any known or later developed automatic, computer-aided technique allowing information to be easily, quickly and accurately recorded. For instance, the package and vehicle information may be captured using known bar code scanning techniques in combination with bar codes located on the package and the various delivery vehicles. Alternatively, the package and vehicle information may be captured using a technique employing RFID (radio frequency identification) tags on the packages and vehicles. Hereinafter, any reference to the recording of package or vehicle information may be assumed to contemplate bar code scanning, RFID techniques, manual entry or any other appropriate method of data capture. An exemplary database record 300 containing package and carrying vehicle information is shown in FIG. 3.

As a delivery vehicle is loaded and package information is recorded to reflect a 'package handling even' as is done today, when operating in accordance with embodiments of the present invention, vehicle identifying information, such as a vehicle ID number 310 is recorded along with the standard tracking number 315, time 320, date 325, and activity 330 associated with the package. Other package-related information may also be recorded, as is found desirable by the users or the delivery company. By modifying the recording mechanism (referred to hereinafter as a scanner, which term is to be interpreted as including whatever data capture mechanism is associated with the data capture technique being utilized) to include a vehicle identifier with each record it creates for recorded packages, no additional processes or manual efforts are required beyond the prior art practice.

Methods embodying the present invention preferably do not require that the vehicle identifying information be entered into the scanner as each package is scanned. The operator may enter it once, as the vehicle loading begins, and the scanner may maintain it until another vehicle identifier is entered. The registered vehicle identifier would be associated with each package record. As mentioned above, to reduce the possibility of human error, the operator would preferably enter the vehicle identifying information by capturing the vehicle identifier directly in an automatic manner, such as by using bar code, RFID tag or other type of automated data recording and capturing technology.

The package information captured and stored with respect to each package handling event should also include the location of the event. Such location information may be entered manually or by using an automated data capture technology as discussed above associated with, for instance, a loading dock or warehouse where the delivery vehicle is being loaded or unloaded or a distribution center where the package is being sorted. Alternatively, the location information associated with the package handling event may be obtained using any known or later developed real-time location sensing technology, such as global positioning satellite (GPS) technology. The location information, like the vehicle identifier, may be maintained until changed and is associated with each package being handled.

As a result of the scanning and recording process described above in accordance with embodiments of the present invention, a package tracking database is created and maintained. The package tracking database includes records relating to each 'package handling event' as is known in the art, but additionally relates each package record to the delivery vehicle carrying the package. Also in accordance with the present invention, the location of each delivery vehicle is recorded as of when packages are loaded or unloaded and the location information is stored, such as in a vehicle tracking database. Like the location information stored in the package tracking database, the vehicle location information may be entered manually or by using an automated data capture technology associated with, for instance, a loading dock or warehouse where the delivery vehicle is being loaded or unloaded.

The location of each delivery vehicle as recorded in the vehicle tracking database may also be updated from time to time as the vehicle travels along its routes by tracking the vehicle's location using, for example, any of the available electronic tracking systems, manual or computer-automated driver check-ins, GPS-enabled techniques, etc. Alternatively, the real-time location of a vehicle in transit may not be added to the vehicle tracking database but may be utilized on a real-time basis to report the actual location of vehicles and packages, for example, in response to a user inquiry.

By linking the package tracking information to the vehicle tracking information, and optionally updating the location of the vehicle using the real-time vehicle location information, the exact location of a package may be identified at anytime during transit. FIG. 4 illustrates a package tracking database 400 and a vehicle (or truck) tracking database 402 in accordance with embodiments of the present invention. FIG. 4 also shows the requisite link 405 between the two databases.

Figure 5:
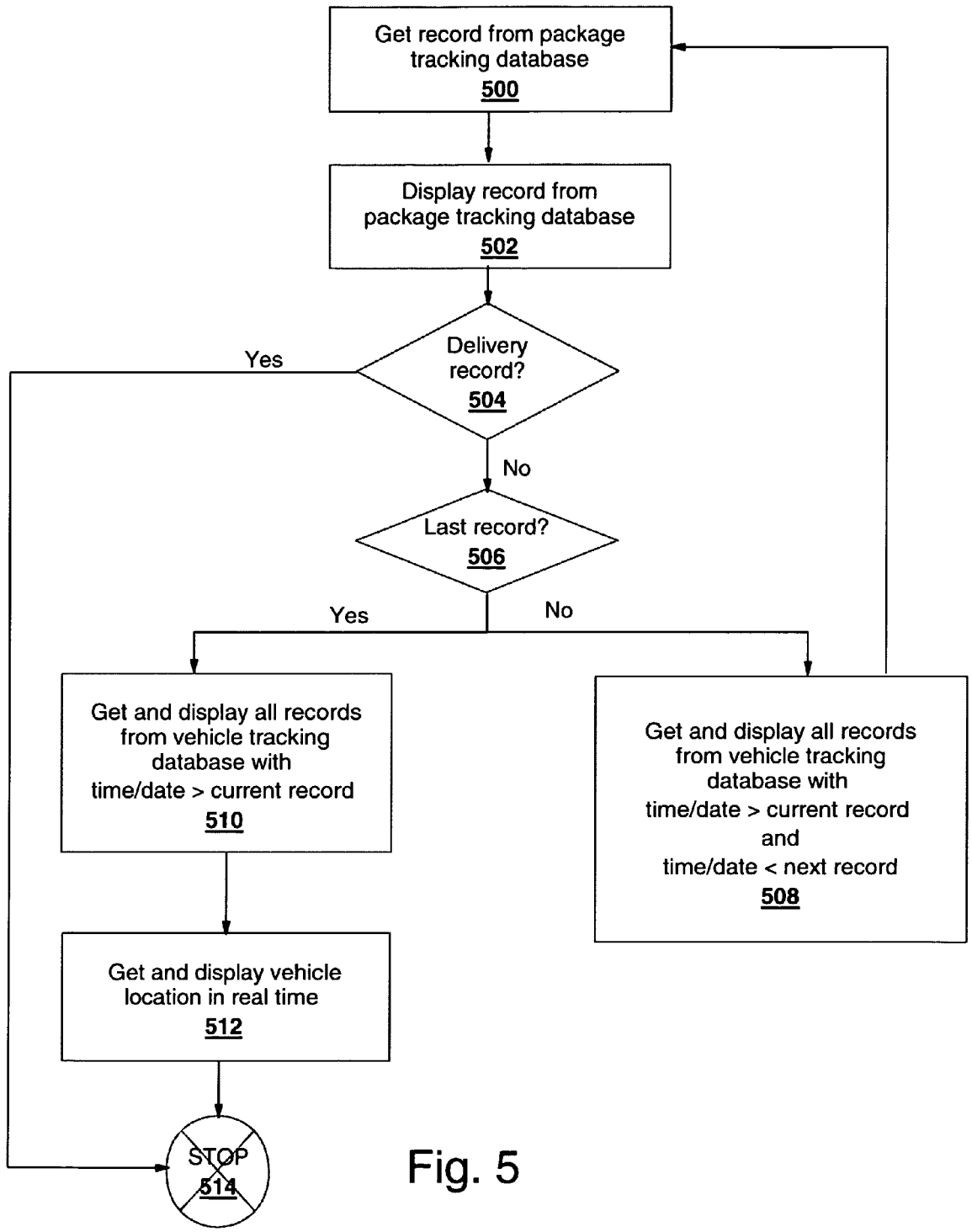
FIG. 5 is a flow chart illustrating the procedure used by an e-mail server or web server at the delivery company to display tracking information in accordance with an embodiment of the present invention.

When an interested user makes an inquiry with respect to a package using a package tracking number, an e-mail or web server of the delivery company utilizes the package tracking database and the vehicle tracking information to report the package's location and status to the user. With reference now to FIG. 5, a process is illustrated which may be followed by the delivery company's server in accordance with embodiments of the present invention. The process in FIG. 5 is performed using records in the package tracking database 400 and vehicle location information, available from the vehicle tracking database 402, for example. Those skilled in the relevant arts will readily recognize that the present invention is not limited to the exact steps or sequence shown in FIG. 5. For this process, it is assumed that records are accessed from the package tracking database 400 in chronological order. It is also assumed that the vehicle location information is available both in the vehicle tracking database 402 and in real-time from the mechanism utilized to track the real-time location of the delivery vehicles.

When a package tracking request from an interested user is received by the delivery company server, at step 500 the server fetches a package record such as that shown in FIG. 3 from the package tracking database 400. The information therein is added to a message to be returned to the requestor. Hereinafter, this act will be referred to as display. The retrieved information is displayed in step 502.

In step 504, the record just retrieved is tested. If that record indicates that the package was delivered, the process is exited at step 514, since there will be no more information. The test in step 504 is an optional process step because, if the package has been delivered, subsequent process steps will not cause additional information to be displayed. However, the inclusion of the test in step 504 avoids additional, unnecessary database accesses.

At 506, a test is performed to see if the record fetched in step 500 is the last record, by attempting to peek at the next record. A peek operation is a known database operation which retrieves information from the next record, but does not advance the record pointer to the next record.

If it is determined at 506 that no record is available after the record fetched in step 500 (the record from step 500 is the last record for this package in the database), then the package must currently be on board a vehicle in transit (since it hasn't been delivered). In step 510, the record fetched in step 500 is examined for the time, date, and vehicle identifier. The truck tracking database 402 is then accessed for all records relating to the referenced vehicle posted after that time and date, the time when the package was loaded onto the truck.

In step 512, the location of the truck is requested in real time and displayed, by accessing, for example, a satellite-based tracking system. Geographic coordinates may be returned from the real-time system, so that an internet link to any of the known map-display systems or websites (Mapquest™ or MapBlast™, for example) may be displayed for a graphical representation of the vehicle's location. Alternatively, the coordinates could be converted to the name of the nearest town or city and that name could be displayed. The process then exits at 514.

If it is determined at step 506 that one or more records is available after the record fetched at step 500, then the package has been scanned again since the record at step 500 was recorded. In step 508, time and date stamps from the record fetched at step 500 and the record peeked at step 506 are used, along with the vehicle identifier from the record fetched at step 500 to access the truck tracking database 402. Only records with time/date stamps between the two time/dates are fetched and displayed, so as not to display the location of the vehicle before the package being tracked was loaded or after the package was unloaded. Since there is more information available (as determined at step 506), the process does not end. Flow continues with step 500 where the next record is fetched—the record that was peeked at step 506. The process according to an embodiment of the present invention thus continues until all package and vehicle tracking information associated with the relevant package has been retrieved and displayed.

FIGS. 6 through 12 each shows an exemplary tracking report display which might be produced as a result of the process of FIG. 5 for a package (or packages) having a tracking identifier 602 of "1Z 234 567 89 0123 456 7". The chronologically first display shown in FIG. 6 includes package shipment history details 604 of (i) being picked up at the shipper on June 11, (ii) being placed on a truck in the evening of that same day in San Francisco, and (iii) en route at Los Angeles in the evening of the next day. Similar shipment location details are shown for the package in FIGS. 7 through 11 as the package progresses across the country until being delivered in Raleigh, N.C. as shown in FIG. 12. These figures illustrate an embodiment of the present invention wherein any real-time location coordinates for the delivery vehicle have been converted to the name of the nearest town or city. Alternatively, the real-time delivery vehicle location information may be represented graphically in a map display (not shown).

FIG. 13 shows a package tracking report for the package (or packages) shown in FIGS. 6 through 12 in accordance with an alternate embodiment of the present invention. Many of the location details provided by the processes of the present invention necessarily do not involve the actual scanning of the package. Package handling events typically involve the scanning of the package, but only occur when the package is loaded onto, or unloaded from, a delivery vehicle. Similarly, 'vehicle access' events occur when location information associated with a delivery vehicle is captured into the vehicle tracking database as a result of actual interaction with the vehicle. For instance, the location of a vehicle can be entered into the database whenever the vehicle is loaded, unloaded, serviced or even re-fueled and will typically be entered by scanning information from the vehicle. In accordance with embodiments of the present invention, location detail records may be created and displayed for a delivery vehicle at any time using the real-time tracking mechanisms already discussed—and are typically created when an interested user makes a package inquiry. The alternate embodiment of the present invention illustrated in FIG. 13 includes an indication of which entries are the result of scanning the package and, by implication, which are not. Such information may aid the delivery company in tracing a misplaced package by identifying location(s) where the physical presence of the package was confirmed. If so desired, the displayed information may also indicate which entries are the result of a vehicle access—indicating confirmed phsyical presence of the vehicle.

Figure 15:
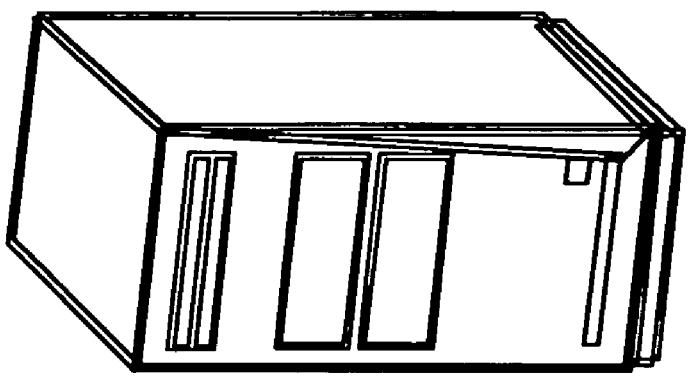
FIG. 15 shows an exemplary computer system appropriate for executing instructions for implementing methods in accordance with embodiments of the present invention.
Figure 14:
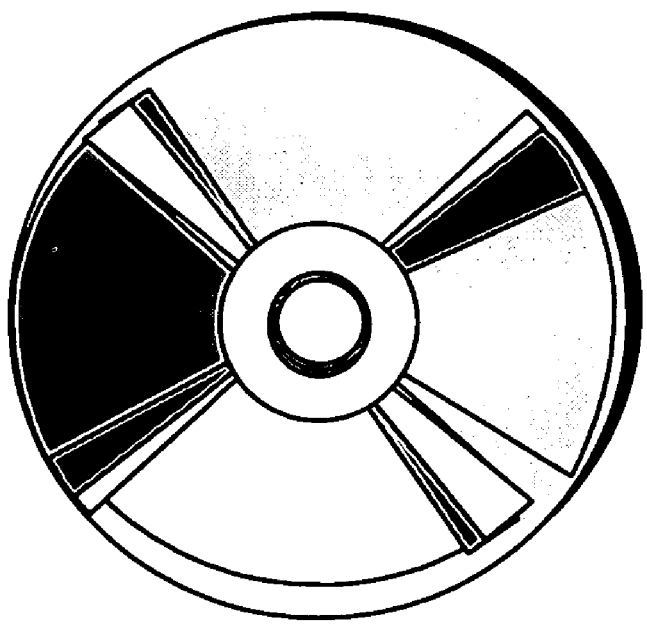
FIG. 14 shows an optical disk as an exemplary computer-readable medium storing instructions for implementing methods in accordance with embodiments of the present invention.

The process steps here described are preferably embodied in computer executable instructions carried on a computer readable medium, such as an optical disk 1400 as shown in FIG. 14. Such instructions are executed on a computer system such as the system 1500 shown in FIG. 15. Persons of skill in the applicable arts will understand that the computer system, while illustrated as a single such system, may be distributed with processing of various functions, such as the display of information and database maintenance, distributed across a network. Indeed, access to the information tracking a parcel and a vehicle may be gained through an open network such as the Internet.

In the drawings and specifications there have been set forth various preferred embodiments of the present invention and, although specific terms are used, the description thus given uses terminology in a generic and descriptive sense only and not for purposes of limitation. Various modifications may be made to the methods, systems and programs of the present invention without departing from the spirit and scope of the invention, which scope is to be defined solely by the claims appended hereto.

What is claimed is:

1. A method comprising:
   gathering data during a transit of a package between a source location and a destination location, the data comprising:
      package data, the package data comprising:
         a package identifier and
         a package location, and
      delivery vehicle data associated with a delivery vehicle carrying the package, the vehicle data comprising:
         a vehicle identifier and
         a vehicle location;
   consolidating the gathered data to develop current package location information; and
   providing access to the current package location information in a consolidated tracking display,
   wherein gathering the package data comprises recording the package data in a package tracking database each time the package is handled during the transit, and
   wherein gathering the vehicle data comprises recording the vehicle data in a vehicle tracking database each time the vehicle is accessed during the transit.

2. The method in accordance with claim 1, wherein consolidating the gathered data comprises updating the gathered vehicle location data with real-time vehicle location information.

3. The method in accordance with claim 2, wherein the real-time vehicle location information is captured using global positioning satellite (GPS) technology.

4. The method in accordance with claim 2, wherein the consolidated display comprises an indication to a user of which data derives from package handling.

5. The method in accordance with claim 1, wherein consolidating the gathered data comprises linking the package data to the vehicle data.

6. The method in accordance with claim 5,
   wherein the package data further comprises the vehicle identifier, and
   wherein the linking comprises utilizing the vehicle identifier of the package data to access the vehicle tracking database and retrieve the vehicle data for the vehicle carrying the package.

7. The method in accordance with claim 6,
   wherein consolidating the gathered data comprises updating the gathered vehicle location data with real-time vehicle location information, and
   wherein the consolidated display comprises an indication to a user of which data derives from package handling.

8. The method in accordance with claim 1,
   wherein recording the package data in a package tracking database comprises capturing the package identifier directly from the package using an automated data capture technology, and
   wherein recording the vehicle data in a vehicle tracking database comprises capturing the vehicle identifier directly from the vehicle using the automated data capture technology.

9. The method in accordance with claim 8, wherein the automated data capture technology comprises at least one of bar code technology and radio frequency identification (RFID) tag technology.

10. A program product comprising:
    a computer readable medium and computer readable instructions embodied thereon and effective when executing on a computer system to:
       gather data during a transit of a package between a source location and a destination location, the data comprising:
          package data, the package data comprising:
             a package identifier and
             a package location, and
          delivery vehicle data associated with a delivery vehicle carrying the package, the vehicle data comprising:
             a vehicle identifier and
             a vehicle location;
       consolidate the gathered data to develop current package location information; and
       provide access to the current package location information in a consolidated tracking display,
    wherein the instructions for gathering the package data comprise instructions effective when executing to record the package data in a package tracking database each time the package is handled during the transit, and
    wherein the instructions for gathering the vehicle data comprise instructions effective when executing to record the vehicle data in a vehicle tracking database each time the vehicle is accessed during the transit.

11. The program product in accordance with claim 10,
    wherein the instructions for recording the package data comprise instructions effective when executing to capture the package identifier directly from the package using an automated data capture technology, and
    wherein the instructions for recording the vehicle data comprise instructions effective when executing to capture the vehicle identifier directly from the vehicle using the automated data capture technology.

12. The program product in accordance with claim 11, wherein the automated data capture technology comprises at least one of bar code technology and radio frequency id (RFID) tag technology.

13. The program product in accordance with claim 10, wherein the instructions for consolidating the gathered data comprise instructions effective when executing to update the gathered vehicle location data with real-time vehicle location information.

14. The program product in accordance with claim 10, wherein the instructions for consolidating the gathered data comprise instructions effective when executing to link the package data to the vehicle data.

15. The program product in accordance with claim 14,
    wherein the package data further comprises the vehicle identifier, and
    wherein the instructions for linking comprise instructions effective when executing to utilize the vehicle identifier of the package data to access the vehicle tracking database and retrieve the vehicle data for the vehicle carrying the package.

16. The program product in accordance with claim 15,
    wherein the instructions for consolidating the gathered data further comprise instructions effective when executing to update the gathered vehicle location data with real-time vehicle location information using global positioning satellite (GPS) technology, and wherein the instructions for providing the consolidated tracking display comprise instructions effective when executing to indicate to a user which data derives from package handling.

17. The program product in accordance with claim 13, wherein the real-time vehicle location information is captured using global positioning satellite (GPS) technology.

18. The program product in accordance with claim 13, wherein the instructions for providing the consolidated tracking display comprise instructions effective when executing to indicate to a user of which data derives from package handling.

* * * * *